(12) United States Patent
Maruyama et al.

(10) Patent No.: US 6,826,577 B1
(45) Date of Patent: Nov. 30, 2004

(54) METHOD AND APPARATUS FOR DATA STORAGE, AND RECORDING MEDIUM THEREFOR

(75) Inventors: Tetsuya Maruyama, Nagaoka (JP); Naoko Miyagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/245,918

(22) Filed: Feb. 8, 1999

(30) Foreign Application Priority Data

Aug. 11, 1998 (JP) .......................................... 10-227331

(51) Int. Cl.$^7$ ............................................. G06F 17/30
(52) U.S. Cl. ..................... 707/104.1; 707/1; 715/500.1; 345/760
(58) Field of Search .................. 707/1, 104.1; 709/218; 345/326, 329, 760, 762, 428, 642; 715/500.1, 501.1

(56) References Cited

U.S. PATENT DOCUMENTS

| | | | | |
|---|---|---|---|---|
| 5,559,936 A | * | 9/1996 | Poulter et al. | 345/428 |
| 5,657,433 A | * | 8/1997 | Murase et al. | 345/642 |
| 5,760,771 A | * | 6/1998 | Blonder et al. | 345/854 |
| 5,845,067 A | * | 12/1998 | Porter et al. | 713/200 |
| 5,911,139 A | * | 6/1999 | Jain et al. | 707/3 |
| 5,953,720 A | * | 9/1999 | Mithal | 707/10 |
| 5,983,245 A | * | 11/1999 | Newman et al. | 715/513 |
| 6,012,069 A | * | 1/2000 | Shibazaki | 707/104.1 |
| 6,038,365 A | * | 3/2000 | Yamagami | 386/46 |
| 6,044,387 A | * | 3/2000 | Angiulo et al. | 715/533 |
| 6,097,389 A | * | 8/2000 | Morris et al. | 345/346 |
| 6,119,133 A | * | 9/2000 | Nusbickel et al. | 707/205 |
| 6,141,006 A | * | 10/2000 | Knowlton et al. | 345/335 |
| 6,175,838 B1 | * | 1/2001 | Papierniak et al. | 707/223 |
| 6,237,030 B1 | * | 5/2001 | Adams et al. | 709/218 |
| 6,301,586 B1 | * | 10/2001 | Yang et al. | 707/104.1 |
| 6,304,886 B1 | * | 10/2001 | Bernardo et al. | 715/530 |
| 6,324,538 B1 | * | 11/2001 | Wesinger, Jr. et al. | 707/10 |
| 6,463,455 B1 | * | 10/2002 | Turner et al. | 709/200 |
| 6,470,383 B1 | * | 10/2002 | Leshem et al. | 709/223 |

OTHER PUBLICATIONS

Kerry A. Lehto and W. Brett Polonsky, 'Introducing Microsoft FrontPage 97, Discover how to publish in a flash on your intranet or the World Wide Web', 1997, published by Microsoft Press A Division of Microsoft Corporation, pp. 27–53, 170–172, and 226–23.*

* cited by examiner

*Primary Examiner*—Greta Robinson
*Assistant Examiner*—Cheryl Lewis
(74) *Attorney, Agent, or Firm*—Staas & Halsey LLP

(57) ABSTRACT

Provided are a method and apparatus having simplified operation for data storage according to which data, for example, images contained in a home page, are stored in a computer system, and a recording medium employed in the method and apparatus. The computer system stores images contained in a home page that is composed of character information and image information and that is displayed in a screen. Herein, a document describing the home page and written in a given language is read. Source files of storable images contained in the home page are retrieved from the document. Image information of the images is listed based on the retrieved source files. A desired image is selected from the listed image information. The selected image is then stored on a recording medium.

53 Claims, 5 Drawing Sheets

Fig. 5

```
<HTML>
<HEAD>
    <META NAME="GENERATOR" CONTENT="Adobe PageMill 2.0J Mac">
    <META HTTP-EQUIV="Content-Type" CONTENT="text/html;CHARSET=x-sjis">
    <TITLE>Untitled Document</TITLE>
</HEAD>
<BODY BACKGROUND="BACK.gif">
<P><TABLE WIDTH="619" HEIGHT="155" BORDER="0" CELLSPACING="0" CELLPADDING="0">
<TR>
10 <TD WIDTH="72%"><IMG SRC="TYTLS.gif" WIDTH="375" HEIGHT="170" ALIGN="BOTTOM" NATURALSIZEFLAG="3"></TD>
<TD WIDTH="28%"><P ALIGN=CENTER><IMG SRC="SAMPL.gif" WIDTH="167" HEIGHT="31" ALIGN=BOTTOM" NATURALSIZEFLAG="3"><IMG SRC="HPMK.gif" WIDTH="130" HEIGHT="130" ALIGN="BOTTOM" NATURALSIZEFLAG="3"></TD></TR>
</TABLE>
<TABLE WIDTH="617" HEIGHT="188" BORDER="0" CELLSPACING="0" CELLPADDING="0">
<TR>
<TD WIDTH="37%" HEIGHT="63"><A HREF="http://intertv.or.jp/webnavi/word/eat/eat.html">
<IMG SRC="GURUM.gif" WIDTH="200" HEIGHT="51" ALIGN="BOTTOM" NATURALSIZEFLAG="3"></TD>
20 <TD WIDTH="35%"><A HREF="http://intertv.or.jp/webnavi/word/fashion/fashion.html"><IMG SRC="FASON.gif" WIDTH="200" HEIGHT="51" ALIGN="BOTTOM" NATURALSIZEFLAG="3"></TD>
<TD ROWSPAN="3" WIDTH="28%"><P ALIGN=CENTER><IMG SRC="NITIYO.gif" WIDTH="130" HEIGHT="130" ALIGN="BOTTOM" NATURALSIZEFLAG="3"></TD></TR>
<TR>
```

METHOD AND APPARATUS FOR DATA STORAGE, AND RECORDING MEDIUM THEREFOR

BACKGROUND OF THE INVENTION

1. Field of the Invention

The present invention relates to a method and apparatus for data storage, and a recording medium therefor.

2. Description of the Related Art

In recent years, it has become possible to exchange information in real time among computers that are located around the world and interconnected over the Internet. Home pages are known as a means for providing information over the Internet. A home page is composed of text (document) information and image information, written mainly in hyper text markup language (HTML). The home page can be shared by individual computers connected over the Internet or other networks. It is required that documents or images can be extracted from home pages and utilized effectively in the form of a personal database.

Assume that a document (text information) contained in a given home page must be stored by operating a computer of a prior art. In this case, the leading position of the document, which must be stored, in the home page displayed on the display screen of the computer is pointed to by manipulating a mouse. With a mouse button held down, the mouse is dragged until the last position of the document to be stored is pointed to or the pointed position is shifted from the leading position to the last position. The mouse button is then released, whereby a range of the document that must be stored can be designated. The color of the background of the designated range of the document is changed to, for example, blue. The right mouse button is then clicked inside the range, and the Copy menu will appear. When Copy is clicked, the designated range of the document is temporarily buffered. Affix in the Edit menu is then clicked, whereby the designated range of the document in the home page is fetched from the buffer into a new document.

On the other hand, an image in a given home page may be required to be stored. In this case, the image in the home page displayed on the display screen of a computer, which must be stored, is pointed to by the mouse. When the right mouse button is clicked, the menu "Name and Store Image" appears. Thereafter, a storage place and a file name are entered and the Store button is clicked. The image in the home page can thus be stored.

However, according to the foregoing method of storing an image extracted from a home page in accordance with the prior art, the Name and Store Image menu may not appear. The Name and Store Image menu may not appear, though an image in a home page displayed on the display screen of a computer, which must be stored, is pointed to and then clicked using the mouse. In this case, the image clicked using the mouse cannot be stored. The method of storing an image extracted from a home page in accordance with the prior art has thus a problem. This is attributable to the fact that whether an image requested to be stored can be stored cannot be recognized until the image is pointed out and clicked using the mouse.

Moreover, the home page is displayed with text information and image information arranged in a screen according to a tag borne by an HTML document. For storing a plurality of items of image information contained in a home page, the mouse must be manipulated in order to point out the scattered items of image information.

SUMMARY OF THE INVENTION

Accordingly, an object of the present invention is to solve the foregoing problems and to provide a method and apparatus having simplified operation for data storage to be employed in a computer system, and a recording medium used for the method and apparatus.

A method for data storage, in accordance with the present invention, which attempts to solve the problems is a method of storing desired data selected from data displayed in a screen. Specifically, data of a given kind is retrieved from the displayed data. The retrieved data is listed. Desired data is selected from the listed data. The selected data is then stored on a recording medium.

Owing to the above method, data that must be stored is listed and displayed in a screen. Thus, an operation required to store data on a recording medium can be simplified.

In the method for data storage of the present invention, the displayed data may be composed of character information and image information. The data of a given kind may be the image information.

In the method for data storage of the present invention, the displayed data may be displayed based on a document written in a given language. The data of a given kind may be detected from the contents of the document.

In the method for data storage of the present invention, the listing may be displayed according to a given sort, or type.

In the method for data storage of the present invention, the displayed data may be a remote home page. The data of a given kind may be retrieved from a document written to display the home page.

In the method for data storage of the present invention, the displayed data may be recorded on a local recording medium. The data of a given kind may be retrieved from a document written to display the data recorded on the recording medium.

An apparatus for data storage, in accordance with the present invention, which attempts to solve the aforesaid problems is an apparatus for storing desired data retrieved from data displayed on a screen. The apparatus has a retrieving unit that retrieves data of a given kind from the displayed data, a listing unit that lists the detected data, and a storing unit that stores the selected data on a recording medium.

The apparatus may have another unit that selects desired data from the listed data.

In the apparatus for data storage of the present invention, the displayed data may be composed of character information and image information. The data of a given type may be the image information.

In the apparatus for data storage of the present invention, the displayed data may be displayed based on a document written in a given language. The data of a given kind may be detected from the contents of the document.

In the apparatus for data storage of the present invention, the listing may be displayed according to a given sort.

In the apparatus for data storage of the present invention, the displayed data may be a remote home page. The data of a given kind may be retrieved from a document written to display the home page.

In the apparatus for data storage of the present invention, the displayed data may be recorded on a local recording medium. The data of a given kind maybe retrieved from a document written to display the data recorded on the recording medium.

A recording medium, in accordance with the present invention which attempts to solve the aforesaid problems, is a recording medium readable by a computer. Recorded on the recording medium is a program causing a computer to execute the steps of retrieving data of a given kind from data displayed in a screen, listing the detected data, selecting desired data from the listed data, and storing the selected data on the recording medium.

In the recording medium of the present invention, the program may cause the computer to execute another step of selecting desired data from the listed data.

In the recording medium of the present invention, the displayed data may be composed of character information and image information. The data of a given kind may be the image information. In the recording medium of the present invention, the displayed data may be displayed based on a document written in a given language. The data of a given kind may be detected from the contents of the document.

BRIEF DESCRIPTION OF THE DRAWINGS

The present invention will be more clearly understood from the description as set forth below with reference to the accompanying drawings, wherein:

FIG. 5 is a diagram showing an example of a document describing a home page and written in HTML.

DESCRIPTION OF THE PREFERRED EMBODIMENTS

The preferred embodiments of the present invention will be described below with reference to the accompanying drawings.

Referring to the appended drawings, an embodiment of the present invention will be described below.

Figure 1:
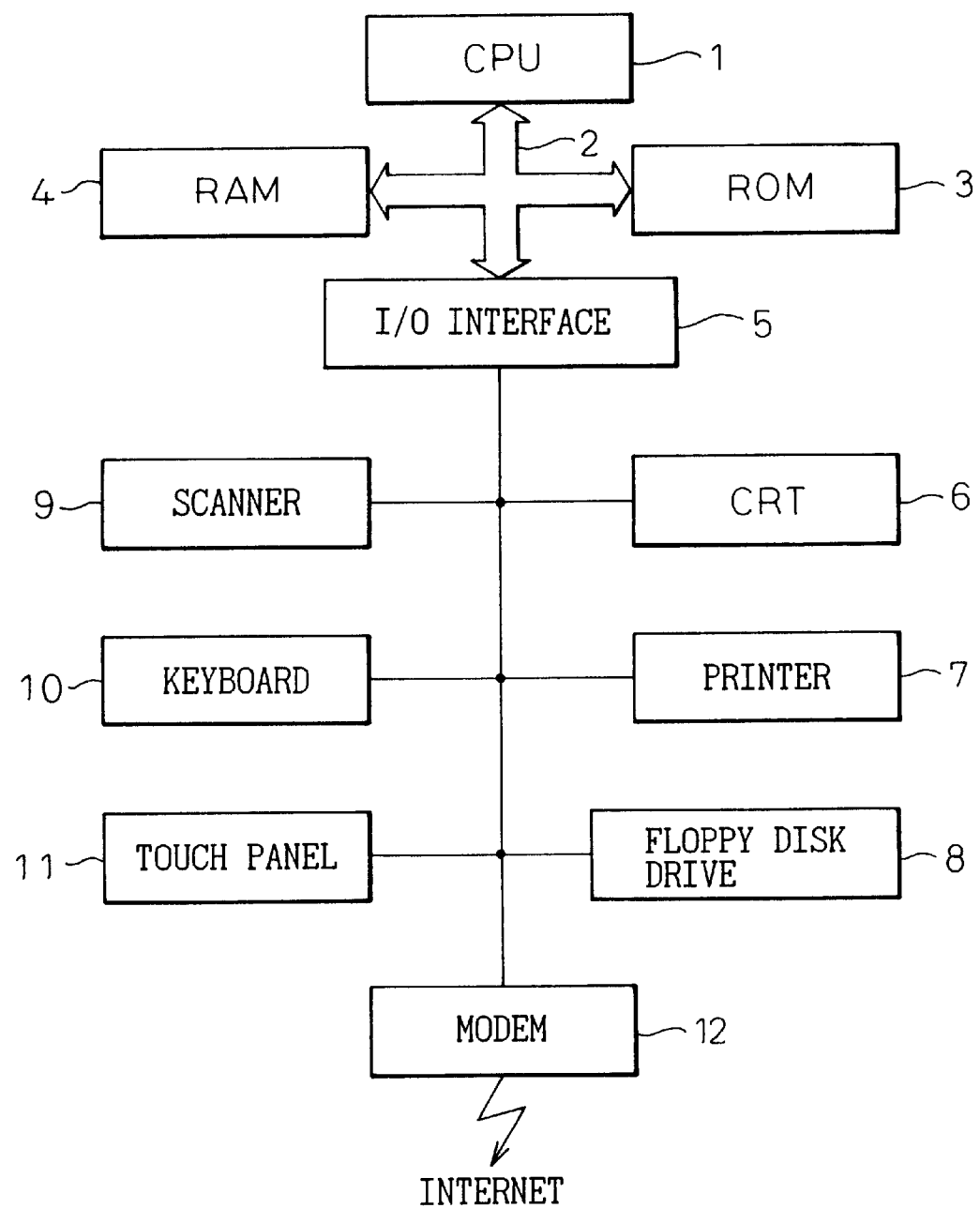
FIG. 1 is a block diagram showing the outline configuration of an embodiment of a computer system in accordance with the present invention.

FIG. 1 is a block diagram showing the outline configuration of an embodiment of a computer system in accordance with the present invention. The computer system shown in FIG. 1 includes a CPU 1. The CPU 1 is connected to a ROM 3, a RAM 4 and an I/O interface over a bus 2. Stored in the ROM 3 are a program for controlling the whole system and a program for executing storage of an image contained in a home page in accordance with the present invention. In the RAM 4, data needed by the system and input/output data are stored temporarily. A CRT 6 for displaying character information and image information on the display screen thereof, a printer 7, and a floppy disk drive 8 are connected to the I/O interface 5 over respective cables. Also connected to the I/O interface 5 are a scanner 9 for reading the character information and image information, a keyboard 10, a touch panel 11, and a modem 12. The touch panel 11 is mounted on the display screen of the CRT 6 and designed to detect positional data of a position on the display screen touched by, for example, a finger. The modem 12 connects the computer system to an external computer over a communication network, for example, the Internet.

Referring to FIG. 1, processing to be carried out according to a program recorded on a recording medium in accordance with the present invention will be described below. The computer system of the present invention shown in FIG. 1 has a central processing unit (CPU) 1, and. recording media, for example, a ROM 3 and RAM 4. The computer system is provided with a reader for reading a portable recording medium (not shown) such as a floppy disk, that is, a floppy disk drive 8. A CD-ROM reader may be substituted for the floppy disk drive 8. A program for causing a computer to execute steps to which the present invention is adapted is recorded on a portable recording medium such as a floppy disk by performing a given manipulation. The program is read by means of the reader and loaded into the RAM 4. Needless to say, an operator may write the program directly in the RAM 4 in the computer system by manipulating an input means such as a keyboard 10. Otherwise, the program may be stored in a recording medium included in a computer system (not shown) owned by another client, for example , a RAM (not shown) The program may then be loaded into the RAM 4 in the computer system via the modem 12 over a network (communication network). Thereafter, the program loaded into the RAM 4 may be executed by the CPU 1 in the computer system when needed.

Moreover, the program may be recorded in the ROM 3 in advance. The program may then be read from the ROM 3 and executed by the CPU 1.

Next, a method of storing an image contained in a home page in the computer system in accordance with the present invention will be described below.

Figure 2:
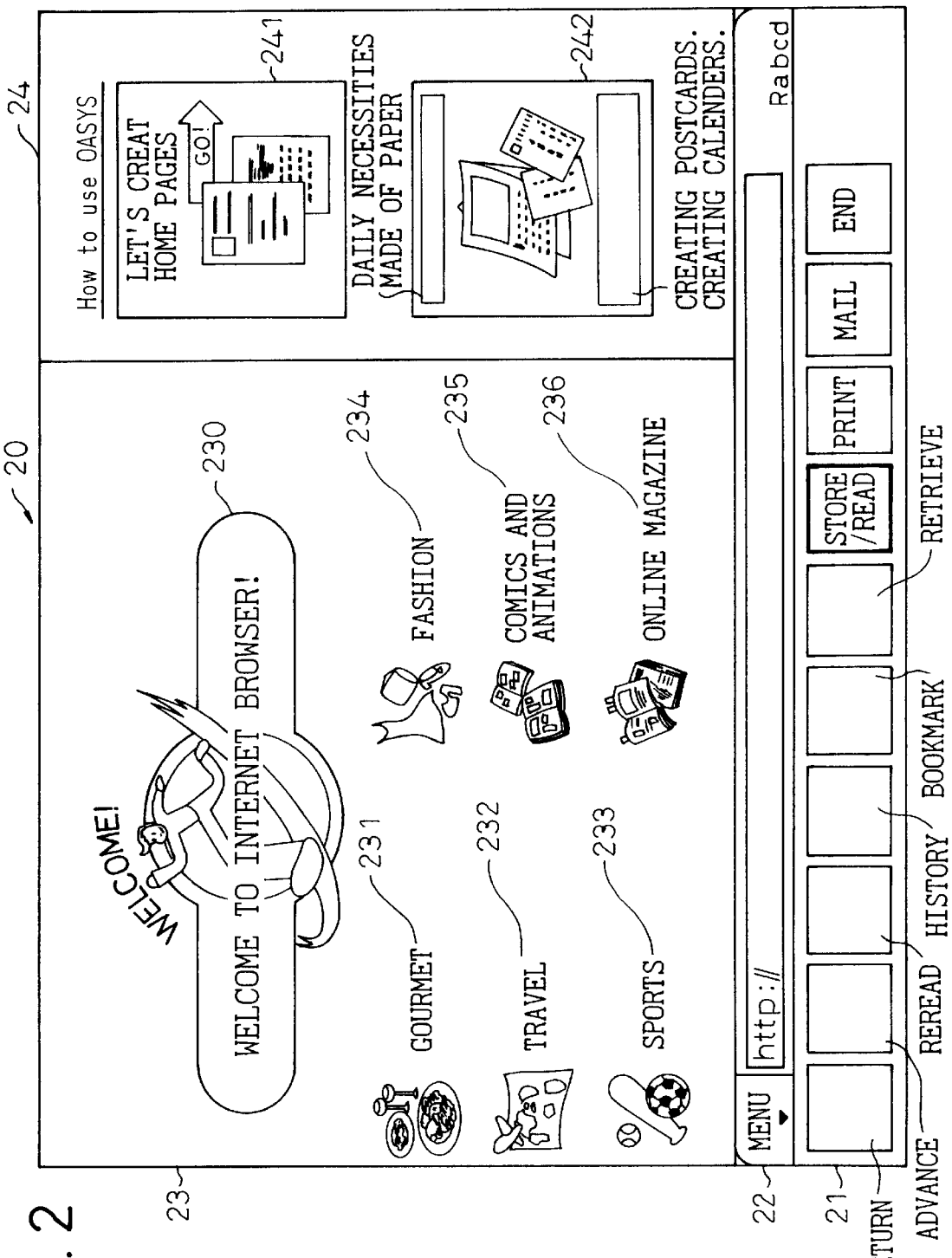
FIG. 2 is a diagram showing an initial screen for a home page produced by the computer system in accordance with the present invention.

FIG. 2 is a diagram showing an initial screen for a home page produced by the computer system in accordance with the present invention. Various menus are displayed in a menu box 21 in the lowermost part of a display screen 20. The menus include a Return menu, Advance menu, Reread menu, History menu, Bookmark menu, Retrieve menu, Store/Read menu, Print menu, Mail menu, and End menu in that order from the left. When Return is selected, control is passed to a screen of a page that has been displayed on a previous stage. When Advance is selected, control is passed to a screen of a page that had appeared when Return was selected. When Reread is selected, information of a home page currently being displayed is read from a remote server or local system and then displayed. When History is selected, home pages accessed after the computer system was activated are listed. A home page that must be seen again can be selected from the listing. When Bookmark is selected, home pages scheduled to be accessed when the computer system is activated next or thereafter can be registered and listed. When Retrieve is selected, control is passed to a screen for retrieval. When Store/Read is selected, control is passed to a screen shown in FIG. 3. It then becomes possible to manipulate the computer system so as to store a text or image contained in a home page currently being seen. When Print is selected, a screen currently being displayed is printed. When Mail is selected, control is passed to a screen in which the computer system is manipulated in order to transmit or receive electronic mail. When End is selected, Internet-related services, for example, services of providing home pages or distributing electronic mail are terminated. Control is then passed to the initial screen produced by the computer system.

Selecting any of these menus is achieved by touching any of the various menus displayed in the menu box 21 in the lowermost part of the screen 20 that is touch sensitive. Alternatively, a cursor may be moved by manipulating a keyboard and the Enter key may then be pressed.

A display area 22 for addresses of home pages is defined above the menu box 21. The address of a home page that must be seen can be keyed in directly in the screen 20. After keying in the address is completed, the Enter key is pressed. The home page will then appear in the screen 20.

In a display area 23 on the left-hand side of the screen 20 with respect to the center thereof, there is a zone 230 in which a message saying, "Welcome to Internet Browser!" appears. Titles of home pages such as Gourmet 231, Travel 232, and Sports 233 are displayed on the left-hand side below the zone 230. Titles of home pages such as Fashion 234, Comics and Animations 235, and Online Magazine 236 are displayed on the right-hand side below the zone 230. Images representing the titles are displayed by the left side of the titles. These images are linked to other servers over the Internet. By touching any of the images, a home page provided by a linked server is downloaded to the RAM in the computer system.

The titles of two home pages "Let's create home pages!" 241 and "Daily Necessities made of paper" 242, and images representing the titles are displayed in a display area 24 on the right-hand side of the screen 20. When any of the images is touched by a finger, a home page entitled by "Let's create home pages!" or "Daily Necessities made of paper" is downloaded to the RAM.

Figure 3:
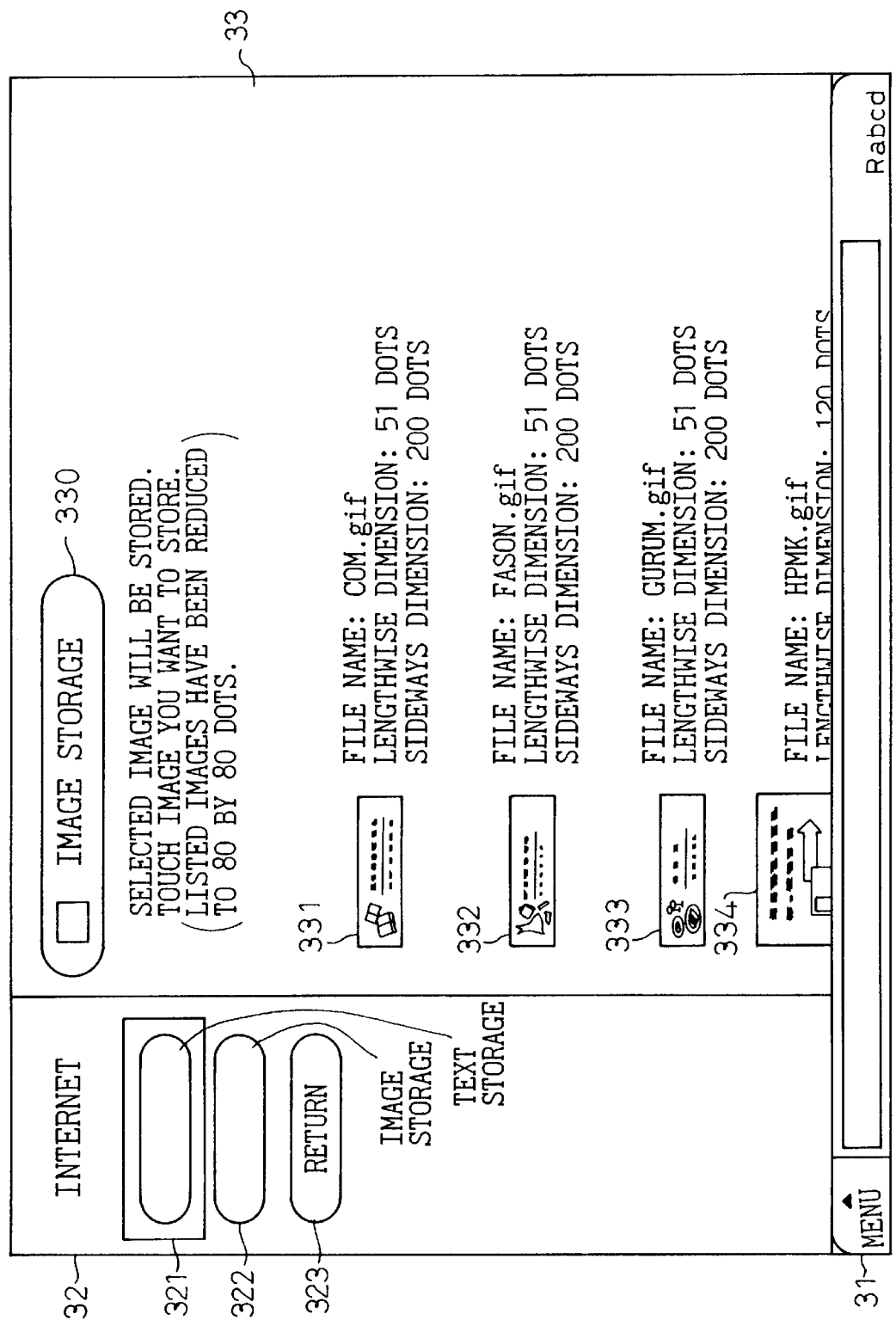
FIG. 3 is a diagram showing a screen in which images contained in a home page are listed.

FIG. 3 is a diagram showing a screen in which images contained in a home page are listed. A display area 31 for the address of a home page is defined in the lower part of a screen 30. The address of a home page relevant to the list of images displayed for image storage in the screen 30 is indicated in the display area 31.

Three buttons of Text Storage, Image Storage, and Return are displayed in a display area 32 in the left-hand part of the screen 30. The Text Storage button 321 in the display area 32 is a button used to display information of a text (not shown) in the display area 33. The Image Storage button 322 is a button used to display information of images in the display area 33. The Return button 323 is a button used to return control to the screen shown in FIG. 2. The Text Storage button 321 in FIG. 3 is enclosed in a square frame. When only the keyboard is used but the touch panel remains unused, as soon as a cursor is moved to the Text Storage button 321, the Text Storage button 321 is enclosed in the frame as shown in FIG. 3. When the cursor has been moved to the Image Storage button 322, the Image Storage button 322 is in turn enclosed in the frame.

Assume that the Image Storage button 322 has been selected. Part of the listing of image information of storable images contained in a home page will, as shown in FIG. 3, then be displayed in the display area 33 on the right-hand side of the screen 30 with respect to the center thereof. Moreover, when the screen is scrolled by manipulating the keyboard, the remaining part of the listing of image information appears. Images 331 to 334, file names relevant to the images, and sizes at which the images are displayed in the display area 33 are displayed in the form of a list.

"Image Storage" appears in a zone 330 defined in the upper part of the display area 33. When the Text storage button 321 in the display area 32 is selected, "Text Storage" will appear in the zone 330. As shown in FIG. 3, storable images contained in a home page are listed in the display area 33. For storing a image, any of the images 331 to 334 that are listed is touched by a finger. For storing information of a text, the Text Storage button 321 should be touched by a finger, and information of a text will appear in the display area 33. A message saying "Do you want to store it?" appears in the display area. If the message is clicked, the information of the text is stored.

Figure 4:
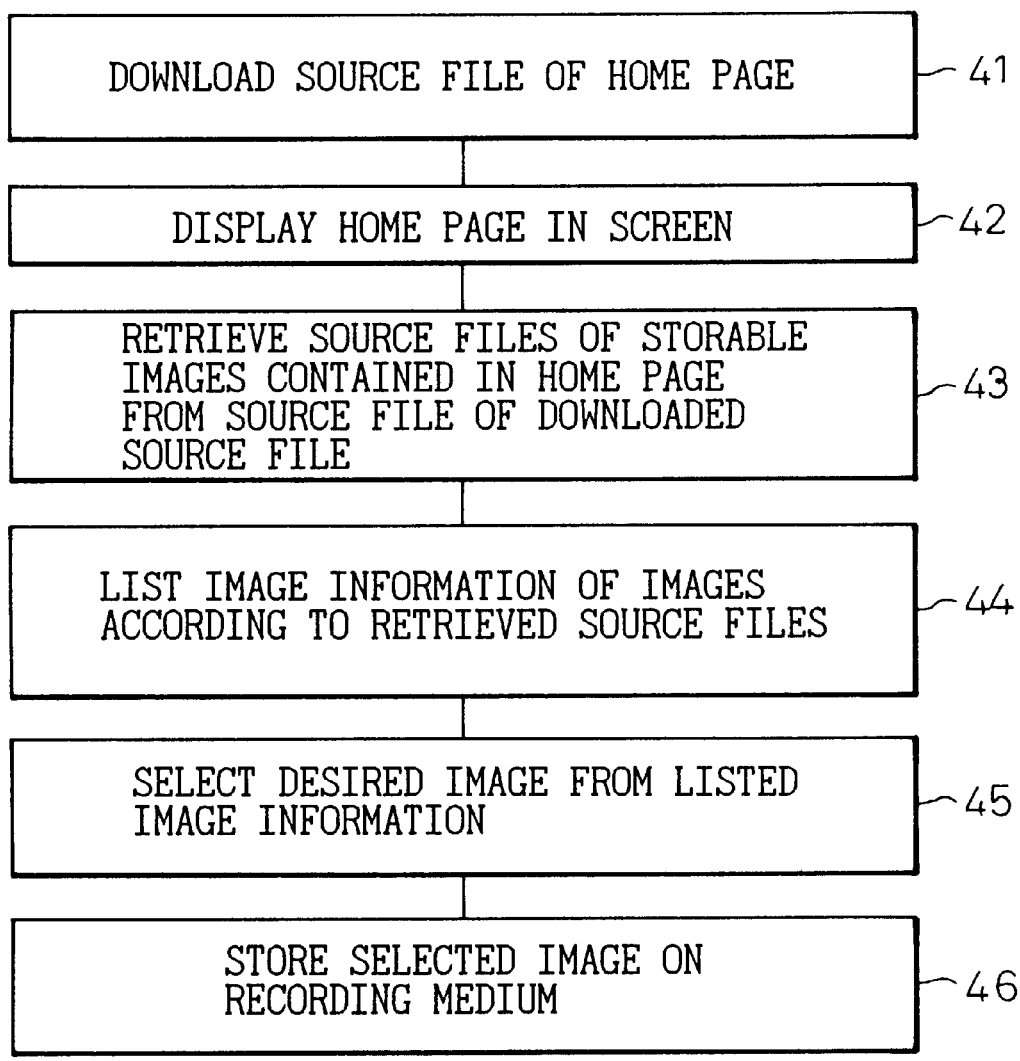
FIG. 4 is a flowchart describing storage of storing an image contained in a home page in accordance with the present invention.

FIG. 4 is a flowchart describing a storage function of storing an image contained in a home page in accordance with an embodiment of the present invention. The processing to be described below is carried out mainly by a program called a browser stored in the ROM in the computer system. To begin with, a menu for invoking a home page is selected from the menu box 21 shown in FIG. 2. Otherwise, the address of the home page is keyed in within the display area 22 and the Enter key is pressed. At step 41, the source file of the desired home page is downloaded to the RAM in the computer system in response to the selection of the menu or the pressing of the Enter key. At step 42, the screen 20 is, as shown in FIG. 2, displayed based on the contents of the source file of the downloaded home page.

At step 43, Storage/Read in the menu box 21 shown in FIG. 2 is touched by a finger. Source files of storable images contained in the downloaded home page are retrieved from the source file of the downloaded home page. At step 44, image information of the images is as shown in FIG. 3, listed in the screen according to the retrieved source files of the images.

At step 45, a desired image is selected from the listed image information. The selection is achieved by touching any of the images 331 to 334 in the listing of the storable images contained in the home page and displayed in the display area 33 in FIG. 3. At step 46, the selected image is stored on a recording medium such as a floppy disk. Moreover, in this embodiment of the present invention the floppy disk maybe of a normal type that offers a storage capacity of 1.2M bytes or 1.4M bytes. Otherwise, the floppy disk may be of a large-capacity type that offers a storage capacity of 120M bytes. Moreover, an image stored in the floppy disk bears the file name of the source file of the image contained in the source file of the home page.

FIG. 5 is a diagram showing an example of a document describing a home page and written in HTML. The step 43 and step 44 in the flowchart of FIG. 4 will be described in conjunction with FIG. 5. FIG. 5 shows a document of a source file describing a downloaded home page. The source file is a file bearing a file name specified last in a uniform resource locator (URL) indicating the address of a home page. The file is downloaded from a server providing the home page to the computer system. The structure of the URL will be briefed below by taking a practical example.

://www.nasda.go.jp/Ranking/1997/Nov.html

The above URL is composed of a protocol http, a sub-domain name www, a domain name nasda.go.jp, directory names Ranking and 1997, and a file name Nov.html. Moreover, the domain name is composed of an organization name nasda, an attribute go, and a country name jp.

Source files of storable images contained in the home page are retrieved from the document of the source file describing the thus downloaded home page. For the retrieval (step 43), IMG SRC found in the description on the tenth line of the document shown in FIG. 5 reading "<IMG SRC="TYTLS.gif"WIDTH="375"HEIGHT="170"---> serves as a key (IMG tag). TYTLS.gif, following=next to IMG SRC, indicates the source file of a storable image contained in the home page. WIDTH="375" HEIGHT="170" is information indicating a size at which the image is displayed. "375" or "170" means the number of dots. The display size in a screen varies depending on a resolution (dots per inch) offered by a computer system employed.

Image information of the images is listed in a screen according to the retrieved source files, of the images (step 44). For example, the description on the nineteenth line of the document shown in FIG. 5 reading "<IMG SRC= "GURUM.gif"WIDTH="200"HEIGHT="51"-> indicates the image information of the images 333 and 332 in the display area 33 shown in FIG. 3. A lengthwise dimension of 51 dots indicated in the display area 33 and a sideways dimension of 200 dots indicated therein correspond to the dot size described in the source file of the home page. However, the dot size of an image described in a source file of a home page does not always correspond to the dot size defined with the lengthwise dimension of 51 dots and the sideways dimension of 200 dots. A size in which an image is actually displayed is indicated in a screen for a home page. In this case, the image is reduced or enlarged to a size defined with the lengthwise dimension of 51 dots and the sideways dimension of 200 dots. In this embodiment of the present invention, a storage size for an image is defined with the lengthwise dimension of 51 dots and the sideways dimension of 200 dots. The storage size is not limited to this one. Alternatively, the storage size may be set to a size in which an image is actually displayed in a screen for a home page or may be set to any desired size.

For listing the retrieved source files of images, various display methods are conceivable. Like the embodiment of the present invention shown in FIG. 3, source files of images retrieved from a source file of a home page may be listed in order of retrieval. Alternatively, the source files may be sorted in alphabetical order or katakana order or by frequency of being displayed in a home page, and then listed. For example, assume that a home page concerns a weather forecast. In this case, a frequency by which a mark indicating sunny weather appears is so high that image information of the sunny weather mark may be listed first.

The present invention has been described by taking an embodiment concerning home pages for instance. The present invention is not limited to this mode. Alternatively, given information composed of character information and image information and stored in a CD-ROM may be interpreted as mentioned above. Source files of storable images may be retrieved. Based on the retrieved source files, the image information may then be listed and displayed in a screen.

As described so far, according to the present invention, data (images) that must be stored and is contained in information (home page) displayed on a screen produced by a computer system are listed and then displayed on a screen. A manipulation needed to store data (images) is simplified, and the time required for the manipulation is therefore shortened.

According to the present invention, given information, for example, information composed of character information and image information and stored in, for example, a CD-ROM can be listed and displayed in a screen. A manipulation needed to store information (images) is simplified, and the time required for the manipulation is therefore shortened.

It will be understood by those skilled in the art that the foregoing descriptions are preferred embodiments of the disclosed apparatus and that various changes and modifications may be made in the invention without departing from the spirit and scope thereof.

What is claimed is:

1. A method for allowing storage of desired multimedia data files of a given kind of media data referenced in a hypertext source file displayed with a browser, comprising:

receiving together both the hypertext source file and multimedia data files referenced therein, where the multimedia data files comprise data files of the given kind of media data, where the receiving is in response to an interactive request to the browser for the hypertext source file;

storing the received multimedia data files in response to the receiving;

displaying at the browser a screen according to the hypertext source file and the multimedia data files referenced therein;

identifying the previously received multimedia data files of a given media data kind that are referenced in the displayed hypertext source file, where the identifying is based on an interactive browser command and the data files are identified based on their being of the given kind of media data, the interactive browser command occurring while the screen according to the hypertext source file is being displayed; and responsive to the identifying, displaying a listing of indicia of the identified multimedia data files of the given kind of media data, where the identifying and displaying is performed with the browser using the already received hypertext and stored data files referenced therein.

2. A method according to claim 1, further comprising:

interactively selecting a desired multimedia data file from the displayed listed multimedia data files; and responsive to the interactive selecting, storing the selected multimedia data file on a recording medium.

3. A method according to claim 2, wherein the markup language tags in the first markup language page are image links and the files identified by the markup language tags are images files.

4. An apparatus for allowing storage of desired multimedia data files of a given kind of media data referenced in a hypertext source file displayed with a browser, the multimedia data files including a plurality of kinds of media data, including at least character information and image information, comprising:

a receiving unit receiving together both the hypertext source file and multimedia data files referenced therein, where the multimedia data files comprise multimedia data files of the given kind of media data, and displaying at the browser a screen according to the hypertext source file and the multimedia data files referenced therein, where the receiving is in response to an interactive request to the browser for the hypertext source file, and where the received multimedia data files are stored in response to the receiving;

an identifying unit identifying the previously received multimedia data files of a given data kind that are referenced in the displayed hypertext source file, where the identifying is based on an interactive browser command and the data files are identified based on their being of the given kind of media data, the interactive browser command occurring while the screen according to the hypertext source file is being displayed; and a display unit displaying a listing of indicia of the identified multimedia data files of the given kind, where the identifying and displaying is performed with the browser using the already received hypertext and multimedia data files.

5. A method for allowing storage of desired multimedia data files of a given kind of media data referenced in a hypertext source file displayed with a browser, comprising:

receiving together both the hypertext source file and multimedia data files referenced therein, where the multimedia data files comprise multimedia data files of the given kind of media data, where the receiving is in response to an interactive request to the browser for the hypertext source file;

storing the received multimedia data files in response to the receiving;

displaying at the browser a screen according to the hypertext source file and the multimedia data files referenced therein;

identifying the previously received multimedia data files of a given data kind that are referenced in the displayed hypertext source file, where the identifying is based on an interactive browser command and the data files are identified based on their being of the given kind of media data, the interactive browser command occurring while the screen according to the hypertext source file is being displayed; and displaying a listing of indicia of the identified multimedia data files of the given kind, where the identifying and displaying is performed with the browser using the already received hypertext and multimedia data files, where the listing includes image information and size information of the listed multimedia data files, and the given kind of media data is image data.

6. A method for storing a desired data according to claim 5, further comprising changing a display size of the listed image information.

7. An apparatus for allowing storage of desired multimedia data files of a given kind of media data referenced in a hypertext source file displayed with a browser, the multimedia data files including a plurality of kinds of media data, including at least character information and image information, comprising:

a receiving unit in the browser receiving together both the hypertext source file and multimedia data files referenced therein, where the multimedia data files comprise multimedia data files of the given kind of media data, and displaying at the browser a screen according to the hypertext source file and the multimedia data files referenced therein, where the receiving is in response to an interactive request to the browser for the hypertext source file, and where the received multimedia data files are stored in response to the receiving;

an identifying unit identifying the previously received multimedia data files of a given data kind that are referenced in the displayed hypertext source file, where the identifying is based on an interactive browser command and the data files are identified based on their being of the given kind of media data, the interactive browser command occurring while the screen according to the hypertext source file is being displayed; and a display unit displaying a listing of indicia of the identified multimedia data files of the given kind, where the identifying and displaying is performed by the browser using the already received hypertext and multimedia data files, where the display unit displays image information and size information of the multimedia data files, wherein the displayed listing is composed of character information and image information, and the given kind is image data.

8. An apparatus for storing a desired data according to claim 7, wherein the display unit displays the listed image information in a changed display size.

9. A recording medium readable by a computer and storing information for causing the computer to perform a process for allowing storage of desired multimedia data files of a given kind of media data referenced in a hypertext source file displayed with a browser, the multimedia data files including a plurality of kinds of media data, including at least character information and image information, the process comprising:

receiving a hypertext source file and multimedia data files referenced therein, where the multimedia data files comprise multimedia data files of the given kind of media data, where the receiving is in response to an interactive request to the browser for the hypertext source file;

storing the received multimedia data files in response to the receiving;

displaying at a browser a screen according to the hypertext source file and the multimedia data files referenced therein;

identifying the previously received multimedia data files of a given data kind of media that are referenced in the displayed hypertext source file, where the identifying is based on an interactive browser command and the data files are identified based on their being of the given kind of media data, the interactive browser command occurring while the screen according to the hypertext source file is being displayed; and displaying a listing of indicia of the identified multimedia data files of the given kind, where the identifying and displaying is performed with the browser using the already received hypertext and multimedia data files, where the listing includes image information and size information of the multimedia data files, and the given kind of media data is image data.

10. A recording medium readable by a computer according to claim 9, the steps further comprising changing a display size of the listed image information.

11. A method for displaying multimedia data files referenced in and received with a hypertext file received by a browser of which a display format is designated, comprising:

interactively instructing the browser to identify multimedia data files of a given kind from among the received multimedia data files referenced in the hypertext file while the screen according to the hypertext source file is being displayed; and generating a listing of indicia of the identified multimedia data files based on the multimedia data files being of the given kind, where the generating is performed with the browser, and the data of a given kind is image data.

12. A method for displaying data according to claim 11, further comprising displaying the listed image data and size information thereof.

13. A method for displaying data according to claim 12, further comprising changing a display size of the listed image data.

14. A method for displaying data according to claim 11, further comprising changing a display size of the listed image data.

15. A method for displaying data according to claim 14, further comprising displaying the listed image data in a given display size.

16. A method for displaying data according to claim 11, wherein the listing of indicia is displayed.

17. A method for displaying data according to claim 16, wherein the displayed indicia comprises image data of the corresponding multimedia data files.

18. A method for displaying data according to claim 16, wherein the displayed indicia comprises image information of the image data of the corresponding multimedia data files.

19. An apparatus for displaying multimedia data files received with and referenced in a hypertext file received by a browser, of which a display format is designated, comprising:
- an identifying unit of the browser that, responsive to a browser interaction, searches for multimedia data files of a given kind from among the received multimedia data files referenced in the hypertext file to be identified, the browser interaction occurring while the screen according to the hypertext source file is being displayed; and
- a listing unit of the browser that generates a listing of indicia of the identified multimedia data files of the given kind, wherein the given kind of media data is image data.

20. An apparatus for displaying data according to claim 19, further comprising a display unit that displays the listed image data and size information thereof.

21. An apparatus for displaying data according to claim 20, wherein the display unit displays the image data in a changed display size.

22. An apparatus for displaying data according to claim 19, further comprising a display unit that displays the image data in a changed display size.

23. An apparatus for displaying data according to claim 22, wherein the display unit displays the listed image data in a given display size.

24. An apparatus for displaying data according to claim 19, further comprising a display unit displaying the listing of indicia.

25. An apparatus for displaying data according to claim 24, wherein the displayed indicia comprises image data of the corresponding multimedia data files.

26. An apparatus for displaying data according to claim 24, wherein the displayed indicia comprises image information of the image data of the corresponding multimedia files.

27. A recording medium readable by a computer and having a program recorded thereon, and causing the computer to perform a process for displaying multimedia data files referenced in and received with a hypertext file received by a browser, the process comprising:
- identifying, with the browser, multimedia data files of a given kind from among the received multimedia data files referenced in the hypertext file of which a display format is designated; and
- generating a listing of indicia of the identified multimedia data files based on the multimedia data files being of the given kind, where the generating is performed with the browser, and the data of a given kind is image data.

28. A recording medium readable by a computer according to claim 27, the steps further comprising displaying the listed image data and size information of the image data.

29. A recording medium readable by a computer according to claim 28, the steps further comprising changing the display size of the listed image data.

30. A recording medium readable by a computer according to claim 27, the steps further comprising changing the display size of the listed image data.

31. A recording medium readable by a computer according to claim 30, the steps further comprising displaying the listed image data in a given display size.

32. A recording medium readable by a computer according to claim 27, wherein the listing of indicia is displayed by the browser.

33. A recording medium readable by a computer according to claim 32, wherein the displayed indicia comprises image data of the corresponding multimedia data files.

34. A recording medium readable by a computer according to claim 32, wherein the displayed indicia comprises information of the image data of the corresponding multimedia files.

35. A method for selecting multimedia data files received with and referenced in a hypertext file, of which a display format is designated, comprising:
- identifying, with a browser, multimedia data files of a given kind from among the received multimedia data files referenced in the file;
- generating and displaying a listing of indicia of the identified multimedia data files of the given kind based on the multimedia data files being of the given kind, where the generating and displaying is performed with the browser; and
- selecting desired multimedia data files from the listed multimedia data files, wherein the multimedia data files of the given kind are image data files.

36. A method for selecting data according to claim 35, further comprising displaying the listed image data and size information thereof.

37. A method for selecting data according to claim 36, further comprising changing a display size of the listed image data.

38. A method for selecting data according to claim 35, further comprising changing a display size of the listed image data.

39. A method for displaying data according to claim 38, further comprising displaying the listed image data in a given display size.

40. An apparatus for selecting multimedia data files referenced in a hypertext file, of which a display format is designated, comprising:
- an identifying unit identifying, with a browser, multimedia data files of a given kind from among the received multimedia data files referenced in the file;
- a display unit generating and displaying a listing of indicia of the identified multimedia data files of the given kind based on the multimedia data files being of the given kind, where the generating and displaying is performed with the browser; and
- a selecting unit selecting desired multimedia data files from the displayed listing, wherein the multimedia data files of the given kind are image data files.

41. An apparatus for selecting data according to claim 40, wherein the display unit displays the listed image data and size information thereof.

42. An apparatus for selecting data according to claim 41, wherein the display unit displays the image data in a changed display size.

43. A recording medium with a program recorded thereon, where the program causes a computer to perform a process for displaying multimedia data files received with and referenced in a hypertext file received by a browser, the process comprising:
- identifying, with the browser, multimedia data files of a given kind from among the received multimedia data files referenced in the hypertext file of which a display format is designated;
- generating and displaying a listing of indicia of the identified multimedia data files based on the multimedia data files being of the given kind, where the generating and displaying is performed with the browser; and
- selecting desired multimedia data files from the listed multimedia data files, wherein the multimedia data files of the given kind are image data files.

44. An apparatus for selecting data according to claim 43, wherein the display unit displays the listed image data in a given display size.

45. A recording medium readable by a computer with a program recorded thereon, where the program causes a computer to execute a process, the process comprising:

identifying at a browser, responsive to a user request to display a given kind of media data, multimedia data files of the given kind, where the multimedia data files are identified from among multimedia data files that have been received with and are referenced in a hypertext file of which a display format is designated;

generating and displaying a listing of indicia of the identified multimedia data files, where the generating and displaying is performed with the browser; and selecting a desired data file from the displayed and listed multimedia data files, wherein the data of the given kind is image data.

46. A recording medium readable by a computer according to claim 45, the steps further comprising displaying the listed image data and size information thereof.

47. A recording medium readable by a computer according to claim 46, the steps further comprising changing a display size of the listed image data.

48. A recording medium readable by a computer according to claim 45, the steps further comprising changing a display size of the listed image data.

49. A recording medium readable by a computer according to claim 48, the steps further comprising displaying the listed image data in a given display size.

50. A recording medium readable by a computer that causes the computer to execute a process for allowing storage of desired multimedia data files of a given kind of media data referenced in a hypertext source file displayed with a browser, the process comprising:

receiving together both the hypertext source file and multimedia data files referenced therein, where the multimedia data files comprise multimedia data files of the given kind of media data, where the receiving is in response to an interactive request to the browser for the hypertext source file;

storing the received multimedia data files in response to the receiving;

displaying at the browser a screen according to the hypertext source file and the multimedia data files referenced therein;

identifying the previously received multimedia data files of a given data kind that are referenced in the displayed hypertext source file, where the identifying is based on an interactive browser command and the data files are identified based on their being of the given kind of media data; and displaying a listing of indicia of the identified multimedia data files of the given kind, where the identifying is performed with the browser using the already received hypertext and multimedia data files.

51. A method, comprising:

receiving, storing, and displaying at a browser a first markup language page comprising markup language tags identifying files containing a particular type of media data; and at the browser, while displaying the first markup language page, receiving an interactive command and in response the browser generating and displaying a screen with which the files identified by the markup language tags may be interactively selected.

52. A method according to claim 51, wherein the markup language is HTML.

53. A browser, comprising:

a storage unit to store a markup language page and files of a specific data type referenced in the markup language page; and a display unit to display the markup language page and the referenced files of the specific data type;

a selection unit, in response to an interactive command to the browser to separately view displayed files of the specific data type, to select the referenced files based on their specific data type, generating screen listing the referenced files; and the display unit to display the screen from the selection unit.

* * * * *